United States Patent Office 2,916,437
Patented Dec. 8, 1959

2,916,437

CRACKING PROCESS WITH A ZEOLITE CATALYST

George R. Gilbert, Elizabeth, N.J., assignor to Esso Research and Engineering Company, a corporation of Delaware No Drawing. Application December 19, 1956
Serial No. 629,227

6 Claims. (Cl. 208—120)

This invention relates to the cracking of hydrocarbons to produce lower boiling hydrocarbons and more particularly relates to the catalytic cracking of hydrocarbons such as gas oil to produce gasoline and middle oil distillate.

Various catalysts are known for the catalytic cracking of hydrocarbons but these catalysts are selected to produce large quantities of gasoline. However, certain refineries are faced with the problem of having to produce larger quantities of heating oils and lesser quantities of gasoline than can be normally produced using the conventional cracking catalysts such as silica-alumina catalyst.

According to the present invention a higher boiling petroleum oil fraction is contacted at cracking temperature with the catalyst of the present invention to produce a much greater amount of middle oil distillate than is produced when using the conventional silica-alumina catalyst.

In the catalytic cracking art it is generally assumed that cracking catalysts containing any appreciable amount of alkali, particularly sodium salts are objectionable and do not form acceptable cracking catalysts. In the manufacture of catalysts using a sodium salt or sodium-containing solution such as sodium silicate, great care is taken to remove as much as possible of the sodium salt or compound remaining in the synthetically prepared catalyst. The silica hydrogel or silica-alumina hydrogel in the manufacture of silica-alumina catalysts is washed several times to bring the sodium oxide content of the catalyst to below 0.5 wt. percent on a dry basis, preferably lower.

In the prior art it is known to produce artificial zeolites and then to treat these zeolites either with acids or with base exchange materials to remove sodium or other alkali metal ions and to provide a catalyst containing less than 1% by weight and preferably less of alkali metal oxide.

With the present invention a treated synthetic silica alumina zeolite is used which contains more than about 10% by weight of sodium oxide on a dry basis. The catalyst is active as a cracking catalyst to produce gasoline and middle oil distillate and after being spent, the catalyst is regenerated by burning the coke or carbon from the catalyst and after regeneration, the catalyst is substantially as active as the fresh catalyst. The catalyst may be used in finely divided condition in fluid dense turbulent beds in the so-called fluid process, as pills, small cylinders or spheres, etc. in fixed beds or moving bed catalytic cracking processes.

In the cracking process the cracking temperature is between about 800° and 1000° F. and the temperature during regeneration is between about 900° and 1200° F. The oil to be cracked may be any high boiling petroleum oil such as gas oil, etc.

More particularly the present invention relates to a catalytic oil conversion process wherein the catalyst comprises a calcined synthetic zeolite. While there are naturally occurring zeolitic materials, the greater proportion of the zeolites are produced synthetically, as for example by reacting sodium silicate with sodium aluminate or by reacting sodium silicate and aluminum sulfate. The resulting gel products have a highly porous structure comprising ultra microscopic pores.

The synthetic zeolite used as the starting product contains up to about 50% water. A typical one has a composition as follows:

| | Percent by weight |
|---|---|
| $Na_2O$ | 9 |
| $Al_2O_3$ | 14 |
| $SiO_2$ | 44 |
| $H_2O$ | 33 |

This synthetic zeolite is sold under the name "Doucil." According to the present invention the synthetic zeolite above described is calcined at a temperature between about 1000° F. and 1250° F. for between about 5 and 3 hours, respectively. The preferred calcination conditions are 3 hours at 1200° F. After calcination, the composition of the sodium aluminum silicate was as follows:

| | Percent by weight |
|---|---|
| $Na_2O$ | 13 |
| $Al_2O_3$ | 22 |
| $SiO_2$ | 65 |

The sodium oxide may vary between about 12 and 13%, the alumina between about 21 and 22% and the silica between about 65 and 67%.

A catalyst prepared as above was used in a cracking operation and was found to be stable and to give a higher ratio of middle oil distillate to naphtha or gasoline than the conventional silica-alumina catalyst.

In a specific example a quantity of the synthetic zeolite (Doucil) (obtained as 8–14 mesh granules) was placed in a muffle furnace and heated to a temperature of about 1200° F. for about 3 hours. The zeolite was calcined in the presence of air, that is, air was not excluded. After the calcination, which drove off substantially all of the water and may have changed the porous structure, the calcined "Doucil" or sodium aluminum silicate was pulverized so that substantially all of the particles were between about 10 and about 120 microns, the major proportion of the calcined "Doucil" or sodium aluminum silicate being between about 20 and 80 microns and this finely divided silicate was then used in a catalytic cracking operation presently to be described.

To compare the results obtained with the new catalyst, synthetic silica-alumina catalyst containing about 13% alumina was used as a catalyst for cracking hydrocarbons under the same conditions. The silica alumina catalyst is a conventional one prepared by mulling a washed silica hydrogel with aluminum sulfate solution, precipitating aluminum hydroxide with dilute ammonium hydroxide, filtering, washing the solids and then calcining for about 3 hours at 1200° F. after most of the water is removed by drying.

The silica-alumina catalyst had a particle size between about 5 and 120 microns with most of the particles being between about 20 and 80 microns.

The cracking was carried out in a testing unit maintained at a temperature of 950° F. The feed stock was a West Texas gas oil having a boiling range between about 650° and 950° F., an API gravity of about 22.7° and contained about 1.66 wt. percent sulfur.

The data obtained are given in the following Table 1.

Table 1

| Catalyst | Commercial SiO$_2$–Al$_2$O$_3$ | Calcined "Doucil" |
|---|---|---|
| How treated | Steam deactivated to 122 m.$^2$/g.[1] | Calcined 3 hrs. at 1,200° F. |
| Cat./oil ratio | 0.93 | 1.95 |
| Average Cat. Temp., °F | 955 | 953 |
| Length of run, Min | 19 | 10 |
| Conversion, wt. percent [2] | 61 | 61 |
| Hydrogen yield s.c.f./b | 65 | 50 |
| Yields Wt. percent: | | |
| C$_3$ and lighter | 6.2 | 9.0 |
| C$_4$ to 430° F. Naphtha | 35.3 | 27.5 |
| 430–650° F. Middle distillate | 18.2 | 21.7 |
| Coke | 1.3 | 3.0 |
| Middle distillate to naphtha ratio | 0.52 | 0.79 |
| Material balance, Wt. percent | 95 | 95 |
| Tests on C$_4$–430° F. Naphtha: | | |
| CFRR O.N. +3 cc. TEL/gAL | 99 | 97 |
| Lamp S in naphtha, wt. percent | 0.2564 | 0.1982 |
| Lamp S 430–650° F. Middle distillate—Wt. percent | 1.744 | 1.169 |

[1] Steamed for 12 hours at 1075° F. and 60 p.s.i.g.

[2] Conversion wt. percent = $\frac{(\text{Coke + products boiling below } 650° \text{ F.})\text{g}}{\text{Feed (grams)}} \times 100$.

From the data in the above Table 1 it will be seen that the sodium aluminum silicate or calcined "Doucil" gave less gasoline and more dry gas and coke but more middle oil distillate than conventional silica-alumina catalyst. In addition the gasoline had less sulfur and the middle oil distillate considerably less sulfur content than that obtained on cracking with conventional silica-alumina catalyst.

As pointed out above the calcined "Doucil" catalyst contains a large amount of sodium oxide and ordinarily this would be considered as a poor catalyst for cracking for the reason that catalysts having high amounts of sodium oxide form a pseudo-glass during regeneration. After the cracking step using the calcined "Doucil," the catalyst was regenerated by burning off the coke with air at about 1100° F. The regeneration took about 2 hours. In a regeneration step in a cracking unit, the regeneration time would be much less.

The regenerated catalyst was then used in another cracking step in which the catalyst to oil ratio was about a half of that shown in Table 1 for the previous run. While the amount of gas and gasoline produced declined a little, the amount of middle distillate oil remained about the same. As less gasoline was produced, the ratio of middle distillate oil to naphtha was greater than in the data given in Table 1 above.

What is claimed is:

1. A process for the catalytic cracking of high boiling hydrocarbons to produce middle oil distillate boiling between about 430° and 650° F. which comprises contacting gas oil at a temperature above about 850° F. with a catalyst produced by calcining for 3 hours at a temperature of about 1200° F. a synthetic zeolite gel (sodium aluminum silicate) and having the following composition:

| | Percent by weight |
|---|---|
| Na$_2$O | 13 |
| Al$_2$O$_3$ | 22 |
| SiO$_2$ | 65 |

2. A process for producing middle oil distillate of low sulfur content and in high yield, which comprises cracking gas oil at a temperature above about 850° F. in the presence of a catalyst produced by calcining a synthetic zeolite gel containing about 12% by weight of sodium oxide.

3. A process for cracking higher boiling hydrocarbons to gasoline and middle oil distillate which comprises contacting gas oil under cracking conditions and at a temperature above about 850° F. with a catalyst made by calcining a synthetic zeolite gel and containing a major portion of silica, a smaller amount of alumina, and about 12—13% by weight of sodium oxide.

4. A process according to claim 3 wherein said synthetic zeolite gel is calcined for about 3 hours at 1200 F.

5. A process according to claim 3 wherein said catalyst has the following composition:

| | Percent by weight |
|---|---|
| Na$_2$O | 13 |
| Al$_2$O$_3$ | 22 |
| SiO$_2$ | 65 |

6. A process for catalytic cracking of high boiling hydrocarbons to produce gasoline and middle oil distillate which comprises contacting gas oil at a temperature above about 850° F. with a catalyst produced by calcining for at least about 3 hours at a temperature of about 1200° F., a synthetic zeolite gel (sodium aluminum silicate) having between about 12 and 13% by weight of sodium oxide in the calcined product.

References Cited in the file of this patent

UNITED STATES PATENTS

| 1,728,732 | Jaeger | Sept. 17, 1929 |
| 2,109,866 | Moser | Mar. 1, 1938 |
| 2,217,252 | Hoog | Oct. 8, 1940 |
| 2,253,285 | Connolly | Aug. 19, 1941 |
| 2,617,712 | Bond | Nov. 11, 1952 |

OTHER REFERENCES

"A Contribution to the Knowledge of Sodium Contamination on Cracking Catalysts," Baker et al., Journal of Physical and Colloid Chem., vol. 52, No. 8, pages 1364 to 1372, November 1948.